United States Patent
Lohani et al.

(10) Patent No.: US 12,432,807 B2
(45) Date of Patent: Sep. 30, 2025

(54) TRAFFIC ARRIVAL BASED DYNAMIC PUCCH

(71) Applicant: Telefonaktiebolaget LM Ericsson (publ), Stockholm (SE)

(72) Inventors: Sudha Lohani, Kanata (CA); Mats Johansson, Spånga (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 463 days.

(21) Appl. No.: 17/920,194

(22) PCT Filed: Apr. 30, 2021

(86) PCT No.: PCT/IB2021/053649
§ 371 (c)(1),
(2) Date: Oct. 20, 2022

(87) PCT Pub. No.: WO2021/224745
PCT Pub. Date: Nov. 11, 2021

(65) Prior Publication Data
US 2023/0189378 A1   Jun. 15, 2023

Related U.S. Application Data

(60) Provisional application No. 63/019,517, filed on May 4, 2020.

(51) Int. Cl.
H04W 76/20   (2018.01)
H04W 72/0446   (2023.01)
H04W 72/21   (2023.01)

(52) U.S. Cl.
CPC ....... *H04W 76/20* (2018.02); *H04W 72/0446* (2013.01); *H04W 72/21* (2023.01)

(58) Field of Classification Search
None
See application file for complete search history.

(56) References Cited

U.S. PATENT DOCUMENTS 10,548,122 B2 * 1/2020 You .............. H04L 1/0068
11,540,260 B1 * 12/2022 Krasniqi .......... H04W 72/542
11,924,861 B2 * 3/2024 Bedekar ........... H04L 5/003
(Continued)

FOREIGN PATENT DOCUMENTS

WO   2019/141894 A1   7/2019

OTHER PUBLICATIONS

International Search Report and Written Opinion dated Aug. 10, 2021 issued in PCT Application No. PCT/IB2021/053649, consisting of 13 pages.
(Continued)

Primary Examiner — Faiyazkhan Ghafoerkhan
(74) Attorney, Agent, or Firm — Weisberg I.P. Law, P.A.

(57) ABSTRACT

A method, system and apparatus are disclosed. In one or more embodiments, a network node is provided. The network node includes processing circuitry configured to: determine an indication of a rate of change of radio resource control, RRC, connected wireless devices; and determine whether to modify a physical uplink control channel, PUCCH, physical resource block, PRB, allocation based at least on the rate of change of RRC connected wireless devices.

23 Claims, 4 Drawing Sheets

BEGIN

Determine an indication of a rate of change of radio resource control, RRC, connected wireless devices
S102

Determine whether to modify a physical uplink control channel, PUCCH, physical resource block, PRB, allocation based at least on the rate of change of RRC connected wireless devices
S104

END

(56) References Cited

U.S. PATENT DOCUMENTS

| | | | | |
|---|---|---|---|---|
| 2011/0280206 A1* | 11/2011 | Johansson | H04W 72/20 |
| | | | 370/329 |
| 2013/0182675 A1* | 7/2013 | Ahn | H04L 5/0053 |
| | | | 370/329 |
| 2014/0036813 A1* | 2/2014 | Lunttila | H04L 5/0037 |
| | | | 370/329 |
| 2015/0063140 A1* | 3/2015 | Yi | H04L 5/14 |
| | | | 370/252 |
| 2015/0071099 A1* | 3/2015 | Yi | H04L 5/1438 |
| | | | 370/252 |
| 2015/0078465 A1* | 3/2015 | Yi | H04L 5/001 |
| | | | 375/260 |
| 2015/0110033 A1* | 4/2015 | Yi | H04L 5/0048 |
| | | | 370/329 |
| 2015/0237611 A1* | 8/2015 | Ahn | H04L 5/001 |
| | | | 370/329 |
| 2017/0171866 A1* | 6/2017 | Cheng | H04W 72/535 |
| 2017/0359805 A1* | 12/2017 | You | H04L 1/0068 |
| 2021/0377948 A1* | 12/2021 | Bedekar | H04L 5/003 |
| 2023/0189378 A1* | 6/2023 | Lohani | H04W 72/21 |
| | | | 370/329 |

OTHER PUBLICATIONS

Nokiaedu, Capacity Management LTE Optimisation Principles [FL16A] Module 09; Internet Citation, Jan. 1, 2016; Retrieved from the Internet: URL:http://juraganibuk.com/downloadFile/09-ra47059en16agla0-capacity-management_pdf [retrieved on Oct. 8, 2018], consisting of 84 pages.

* cited by examiner

TRAFFIC ARRIVAL BASED DYNAMIC PUCCH

CROSS-REFERENCE TO RELATED APPLICATIONS

This application is a Submission Under 35 U.S.C. § 371 for U.S. National Stage Patent Application of International Application No.: PCT/IB2021/053649, filed Apr. 30, 2021 entitled "TRAFFIC ARRIVAL BASED DYNAMIC PUCCH," which claims priority to U.S. Provisional Application No. 63/019,517, filed May 4, 2020, entitled "TRAFFIC ARRIVAL BASED DYNAMIC PUCCH," the entireties of both of which are incorporated herein by reference.

FIELD

The present disclosure relates to wireless communications, and in particular, to dynamic Physical Uplink Control Channel (PUCCH) resource modification based on a rate of PUCCH resource allocation.

BACKGROUND

Current dynamic physical uplink control channel (PUCCH) algorithms increase/decrease PUCCH physical resource blocks (PRBs) based on the number of free resources available in the configured number of PRBs without considering other factors. In particular, the process of adding one more physical uplink control channel (PUCCH) physical resource block (PRB) takes a few seconds because the physical random access channel (PRACH) is moved to a new location and time is needed to send a broadcast page to let the wireless devices (WDs) re-read system information blocks (SIBs).

If the arrival rate of a radio resource control (RRC) connected wireless device is too high or above a threshold, then by the time one more PUCCH PRB are allocated a lot of congestion may have occurred during that time since it takes time to allocate resources in response to new RRC connected wireless devices. Such a situation may negatively affect throughput, latency, etc., of the wireless communication system. Therefore, existing processes for increasing/decreasing PUCCH PRBs rely on specific signaling that take too much time to complete (e.g., few seconds).

SUMMARY

Some embodiments advantageously provide methods, systems, and apparatuses for dynamic Physical Uplink Control Channel (PUCCH) resource modification based on a rate of PUCCH resource allocation.

Dynamic PUCCH should consider one more input parameter, namely, the rate of PUCCH resource allocation, to determine the need to increase/decrease the PUCCH PRBs. The threshold of available PUCCH resources should be calculated based on the rate of PUCCH resource allocation such that the threshold indicates the number of available resources enough to sustain the rate of PUCCH resource allocation until another PRB is allocated.

According to one aspect of the disclosure, a network node is provided. The network node includes processing circuitry configured to: determine an indication of a rate of change of radio resource control, RRC, connected wireless devices, and determine whether to modify a physical uplink control channel, PUCCH, physical resource block, PRB, allocation based at least on the rate of change of RRC connected wireless devices.

According to one or more embodiments of this aspect, the indication of the rate of change of RRC connected wireless devices is based at least in part on a net rate of PUCCH resource allocation. According to one or more embodiments of this aspect, the net rate of PUCCH resource allocation is filtered to reduce fluctuations in the net rate of PUCCH resource allocation. According to one or more embodiments of this aspect, the modification of the PUCCH PRB allocation corresponding to an additional PRB allocation.

According to one or more embodiments of this aspect, the rate of change of RRC connected wireless devices is configured to cause available PUCCH resources to decrease below a first threshold for triggering of the additional PRB allocation. According to one or more embodiments of this aspect, the first threshold is calculated based at least on: a net rate PUCCH resource allocation multiplied by a N target number of slots to sustain the net rate PUCCH resource allocation over a next N transmission time intervals, TTIs, where the indication of the rate of change of RRC connected wireless devices is based at least in part on the net rate of PUCCH resource allocation; and a first predefined margin. According to one or more embodiments of this aspect, the modification of the PUCCH PRB allocation corresponding to a PRB deallocation.

According to one or more embodiments of this aspect, the rate of change of RRC connected wireless devices is configured to cause available PUCCH resources to increase above a second threshold for triggering of PRB deallocation. According to one or more embodiments of this aspect, the second threshold is calculated based at least on: a net rate PUCCH resource allocation multiplied by a N target number of slots to sustain the net rate PUCCH resource allocation over a next N transmission time intervals, TTIs, where the indication of the rate of change of RRC connected wireless devices is based at least in part on the net rate of PUCCH resource allocation; and a second predefined margin. According to one or more embodiments of this aspect, the determination not to modify the PUCCH PRB allocation is based at least in part on the rate of change of the RRC connected wireless devices failing to meet a predefined criterion.

According to one or more embodiments of this aspect, the predefined criterion includes: a first threshold that is configured to trigger PRB allocation based at least in part on available PUCCH resources being less than the first threshold; and a second threshold that is configured to trigger PRB deallocation based at least in part on the available PUCCH resources being greater than the second threshold. The determination not to modify the PUCCH PRB allocation is based at least on the available PUCCH resources being greater than the first threshold and less than the second threshold. According to one or more embodiments of this aspect, the first and second thresholds are calculated based at least on: a net rate PUCCH resource allocation multiplied by a N target number of slots to sustain the net rate PUCCH resource allocation over a next N transmission time intervals, TTIs, where the indication of the rate of change of RRC connected wireless devices is based at least in part on the net rate of PUCCH resource allocation; and a respective predefined margin. The predefined margin for the first threshold is less than the predefined margin for the second threshold. According to one or more embodiments of this aspect, the processing circuitry is further configured to perform communication with a wireless device using at least one PUCCH PRB associated with the determination whether to modify the PUCCH PRB allocation.

According to another aspect of the disclosure, a method implemented by a network node is provided. An indication of a rate of change of radio resource control, RRC, connected wireless devices is determined. A determination is performed whether to modify a physical uplink control channel, PUCCH, physical resource block, PRB, allocation based at least on the rate of change of RRC connected wireless devices.

According to one or more embodiments of this aspect, the indication of the rate of change of RRC connected wireless devices is based at least in part on a net rate of PUCCH resource allocation. According to one or more embodiments of this aspect, the net rate of PUCCH resource allocation is filtered to reduce fluctuations in the net rate of PUCCH resource allocation. According to one or more embodiments of this aspect, the modification of the PUCCH PRB allocation corresponding to an additional PRB allocation. According to one or more embodiments of this aspect, the rate of change of RRC connected wireless devices is configured to cause available PUCCH resources to decrease below a first threshold for triggering of the additional PRB allocation.

According to one or more embodiments of this aspect, the first threshold is calculated based at least on: a net rate PUCCH resource allocation multiplied by a N target number of slots to sustain the net rate PUCCH resource allocation over a next N transmission time intervals, TTIs, where the indication of the rate of change of RRC connected wireless devices is based at least in part on the net rate of PUCCH resource allocation; and a first predefined margin. According to one or more embodiments of this aspect, the modification of the PUCCH PRB allocation corresponding to a PRB deallocation. According to one or more embodiments of this aspect, the rate of change of RRC connected wireless devices is configured to cause available PUCCH resources to increase above a second threshold for triggering of PRB deallocation.

According to one or more embodiments of this aspect, the second threshold is calculated based at least on: a net rate PUCCH resource allocation multiplied by a N target number of slots to sustain the net rate PUCCH resource allocation over a next N transmission time intervals, TTIs, where the indication of the rate of change of RRC connected wireless devices is based at least in part on the net rate of PUCCH resource allocation; and a second predefined margin. According to one or more embodiments of this aspect, the determination not to modify the PUCCH PRB allocation is based at least in part on the rate of change of the RRC connected wireless devices failing to meet a predefined criterion. According to one or more embodiments of this aspect, the predefined criterion includes: a first threshold that is configured to trigger PRB allocation based at least in part on available PUCCH resources being less than the first threshold; and a second threshold that is configured to trigger PRB deallocation based at least in part on the available PUCCH resources being greater than the second threshold. The determination not to modify the PUCCH PRB allocation is based at least on the available PUCCH resources being greater than the first threshold and less than the second threshold.

According to one or more embodiments of this aspect, the first and second thresholds are calculated based at least on: a net rate PUCCH resource allocation multiplied by a N target number of slots to sustain the net rate PUCCH resource allocation over a next N transmission time intervals, TTIs, where the indication of the rate of change of RRC connected wireless devices is based at least in part on the net rate of PUCCH resource allocation; and a respective predefined margin. The predefined margin for the first threshold is less than the predefined margin for the second threshold. According to one or more embodiments of this aspect, communication is performed with a wireless device using at least one PUCCH PRB associated with the determination whether to modify the PUCCH PRB allocation.

According to another aspect of the disclosure, a computer readable medium is provided. The computer readable medium stores instructions, which when executed by a processor, cause the processor to: determine an indication of a rate of change of radio resource control, RRC, connected wireless devices; and determine whether to modify a physical uplink control channel, PUCCH, physical resource block, PRB, allocation based at least on the rate of change of RRC connected wireless devices.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
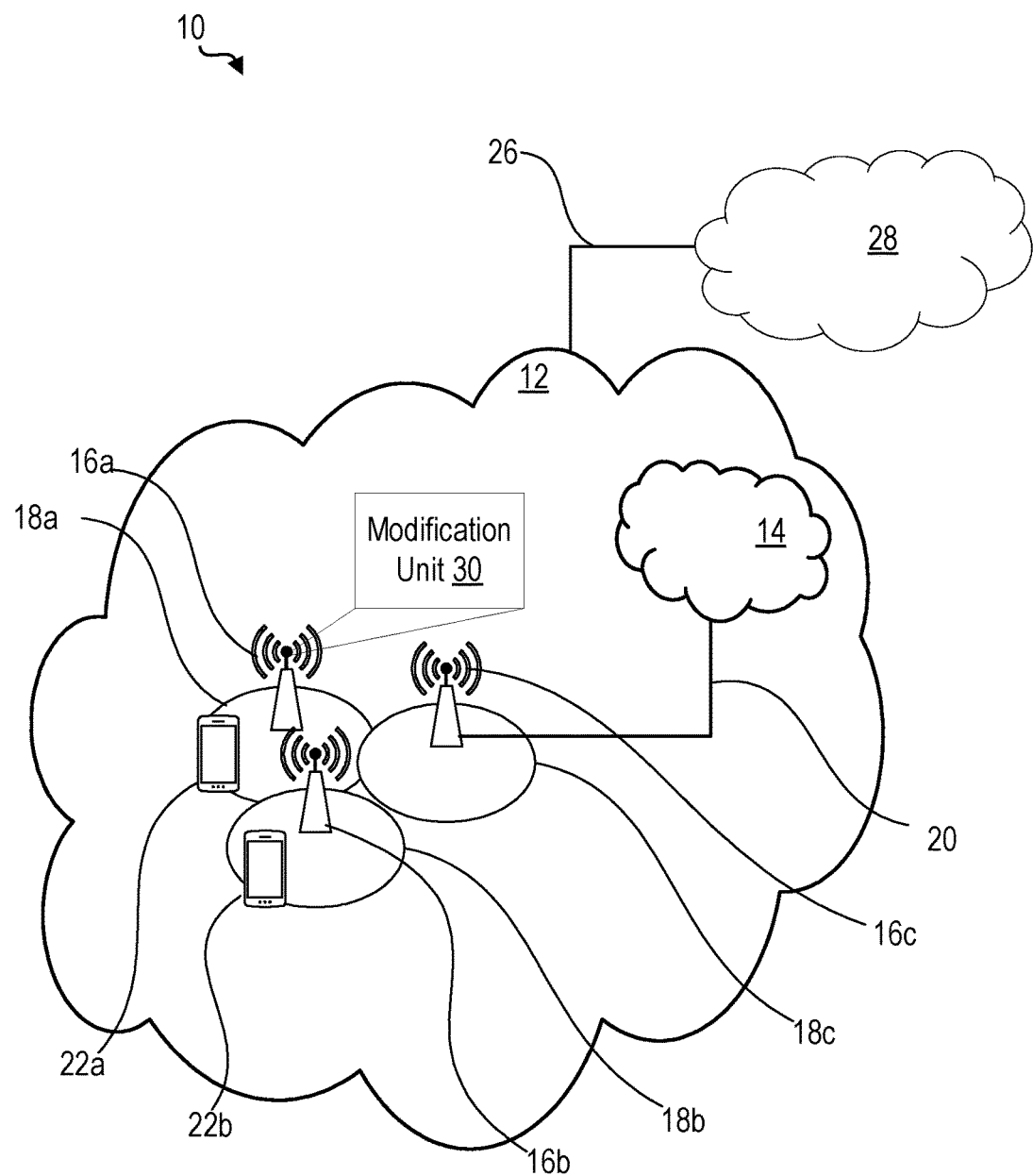
FIG. 1 is a schematic diagram of an exemplary network architecture illustrating a communication system connected via an intermediate network to a host computer according to the principles in the present disclosure.

As described above, the existing/legacy Dynamic PUCCH algorithm fails to consider one or more factors such as a traffic arrival rate such that the existing dynamic PUCCH algorithm may disadvantageously increase congestion in the wireless communication system.

The instant disclosure solves at least a portion of the problems with existing systems at least in part by providing dynamic PUCCH that considers the rate of PUCCH resource allocation to determine the need to increase/decrease the PUCCH PRBs, as described herein. The teachings of the instant disclosure advantageously allow for the system to react quickly to the PUCCH PRB demand that arises with an increasing number of connected (e.g., RRC connected) wireless devices. Further, the teachings described herein advantageously provide for a lower congestion experienced in the transition or a smaller/lower time-window where congestion is experienced.

Before describing in detail exemplary embodiments, it is noted that the embodiments reside primarily in combinations of apparatus components and processing steps related to dynamic Physical Uplink Control Channel (PUCCH) resource modification based on a rate of PUCCH resource allocation.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

The term "resource allocation" as used herein may refer to the allocation of resources, e.g., resource blocks, by a network node, e.g., a scheduler within a network node, for use by a WD. Implementations are not limited solely to resource block, e.g., PRB allocation. It is understood that resource allocation may include other resources used by the WD for wireless communication.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide dynamic Physical Uplink Control Channel (PUCCH) resource modification based on a rate of PUCCH resource allocation. Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The intermediate network 28 may be one of, or a combination of more than one of, a public, private or hosted network and may be in communication with access network 12 via one or more communication links such as a backhaul link. The intermediate network 28, if any, may be a backbone network or the Internet. In some embodiments, the intermediate network 28 may comprise two or more sub-networks (not shown).

The communication system of FIG. 1 as a whole enables connectivity between one of the connected WDs 22a, 22b and the network node 16a-16c. A network node 16 is configured to include a modification unit 30 which is configured to perform network node 16 functions as described herein such as with respect to dynamic Physical Uplink Control Channel (PUCCH) resource modification based on a rate of PUCCH resource allocation.

Example implementations, in accordance with an embodiment, of the WD 22 and network node 16 discussed in the preceding paragraphs will now be described with reference to FIG. 2. The communication system 10 includes a network node 16 provided in a communication system 10 and including hardware 32 enabling it to communicate with the WD 22 and/or other network nodes 16. The hardware 32 may include a communication interface 34 for setting up and maintaining a wired or wireless connection with an interface of a different communication device of the communication system 10, as well as a radio interface 36 for setting up and maintaining at least a wireless connection 37 with a WD 22 located in a coverage area 18 served by the network node 16. The radio interface 36 may be formed as or may include, for example, one or more RF transmitters, one or more RF receivers, and/or one or more RF transceivers. The connection 37 may be direct or it may pass through a core network 14 of the communication system 10 and/or through one or more intermediate networks 28 outside the communication system 10.

In the embodiment shown, the hardware 32 of the network node 16 further includes processing circuitry 38. The processing circuitry 38 may include a processor 40 and a memory 42. In particular, in addition to or instead of a processor, such as a central processing unit, and memory, the processing circuitry 38 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 40 may be configured to access (e.g., write to and/or read from) the memory 42, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 44 stored internally in, for example, memory 42, or stored in external memory (e.g., database, storage array, network storage device, etc.) accessible by the network node 16 via an external connection. The software 44 may be executable by the processing circuitry 38. The processing circuitry 38 may be configured to control any of the methods and/or processes described herein and/or to cause such methods, and/or processes to be performed, e.g., by network node 16. Processor 40 corresponds to one or more processors 40 for performing network node 16 functions described herein. The memory 42 is configured to store data, programmatic software code and/or other information described herein. In some embodiments, the software 44 may include instructions that, when executed by the processor 40 and/or processing circuitry 38, causes the processor 40 and/or processing circuitry 38 to perform the processes described herein with respect to network node 16. For example, processing circuitry 38 of the network node 16 may include modification unit 30 configured to perform one or more network node 16 functions as described herein such as with respect to dynamic Physical Uplink Control Channel (PUCCH) resource modification based on a rate of PUCCH resource allocation.

The communication system 10 further includes the WD 22 already referred to. The WD 22 may have hardware 46 that may include a radio interface 48 configured to set up and maintain a wireless connection 37 with a network node 16 serving a coverage area 18 in which the WD 22 is currently located. The radio interface 48 may be formed as or may include, for example, one or more RF transmitters, one or more RF receivers, and/or one or more RF transceivers.

The hardware 46 of the WD 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 54 at the WD 22, or stored in external memory (e.g., database, storage array, network storage device, etc.) accessible by the WD 22. The software 56 may be executable by the processing circuitry 50. The software 56 may include a client application 58. The client application 58 may be operable to provide a service to a human or non-human user via the WD 22. The client application 58 may interact with the user to generate the user data that it provides.

The processing circuitry 50 may be configured to control any of the methods and/or processes described herein and/or to cause such methods, and/or processes to be performed, e.g., by WD 22. The processor 52 corresponds to one or more processors 52 for performing WD 22 functions described herein. The WD 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to WD 22.

Figure 2:
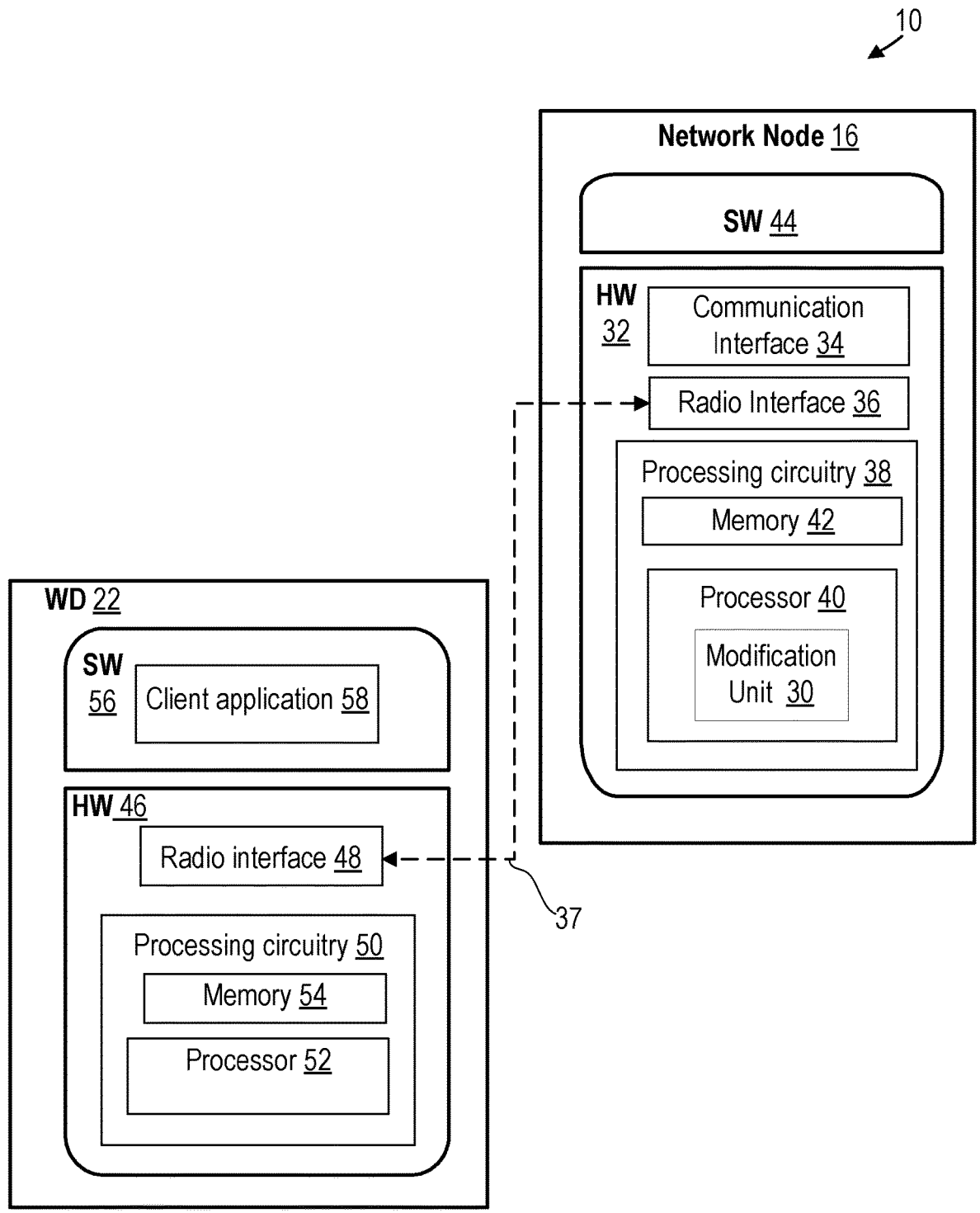
FIG. 2 is a block diagram of a host computer communicating via a network node with a wireless device over an at least partially wireless connection according to some embodiments of the present disclosure.

In some embodiments, the inner workings of the network node 16 and WD 22 may be as shown in FIG. 2 and independently, the surrounding network topology may be that of FIG. 1. Further, the wireless connection 37 between the WD 22 and the network node 16 is in accordance with the teachings of the embodiments described throughout this disclosure.

Although FIGS. 1 and 2 show "unit" such as modification unit 30 as being within a respective processor, it is contemplated that these unit(s) may be implemented such that a portion of the unit is stored in a corresponding memory within the processing circuitry. In other words, the units may be implemented in hardware or in a combination of hardware and software within the processing circuitry.

Figure 3:
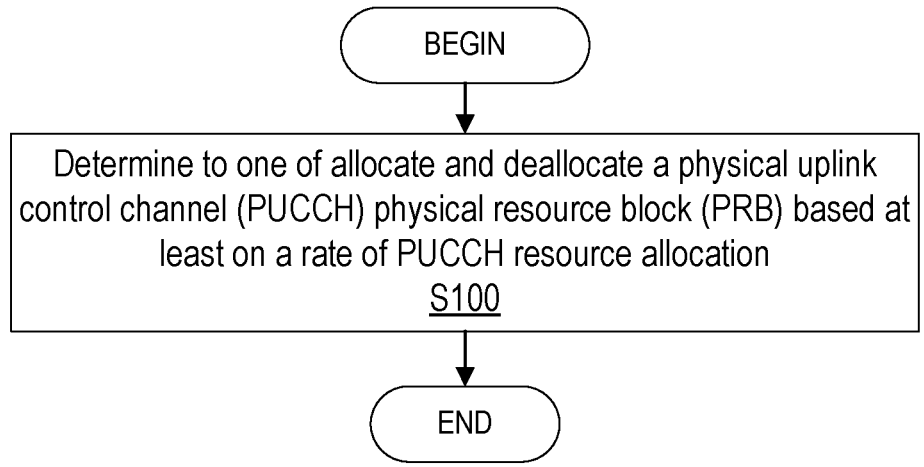
FIG. 3 is a flowchart of an example process in a network node according to some embodiments of the present disclosure.

FIG. 3 is a flowchart of an exemplary process in a network node 16 according to some embodiments of the present disclosure. One or more Blocks and/or functions performed by network node 16 may be performed by one or more elements of network node 16 such as by modification unit 30 in processing circuitry 38, processor 40, radio interface 36, etc. In one or more embodiments, network node 16 is configured to determine (Block S100) to one of allocate and deallocate a physical uplink control channel (PUCCH) physical resource block (PRB) based at least on a rate of PUCCH resource allocation, as described herein.

According to one or more embodiments, the rate of PUCCH resource allocation is based on a measured quantity of PUCCH resources allocation attempts per slot minus a measured number of PUCCH resource deallocations per slot. According to one or more embodiments, the rate of PUCCH resource allocation is used as a threshold, and where the determination is made to allocate the PUCCH PRB based on a quantity of available PUCCH resources being less than the threshold, and where the determination is made to deallocate the PUCCH PRB based on the quantity of available PUCCH resources being greater than the threshold.

Figure 4:
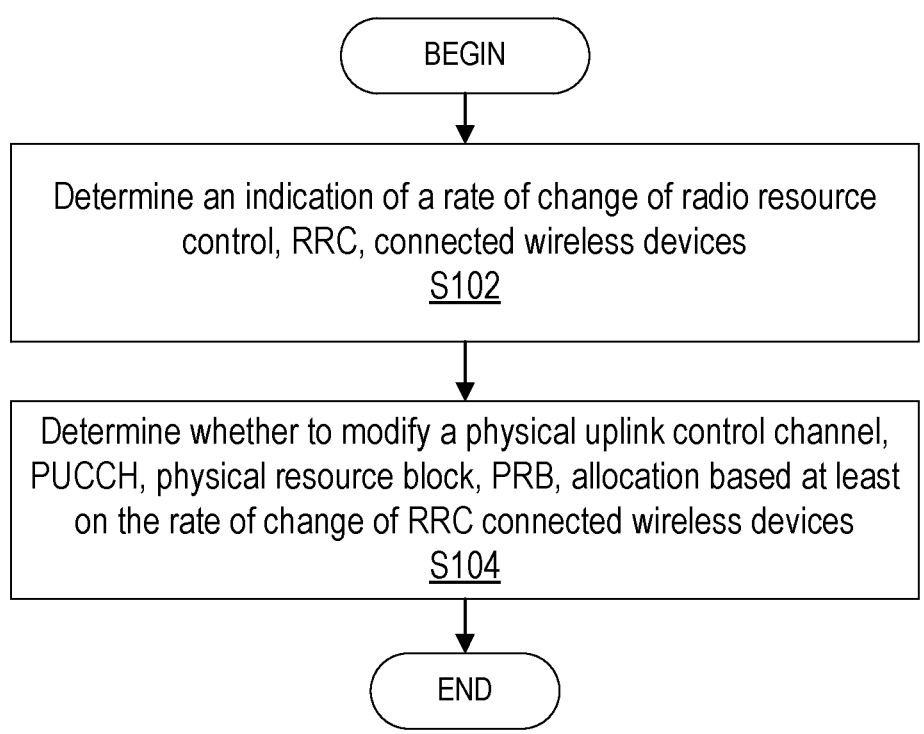
FIG. 4 is a flowchart of another example process in a network node according to some embodiments of the present disclosure.

FIG. 4 is a flowchart of an exemplary process in a network node 16 according to some embodiments of the present disclosure. One or more Blocks and/or functions performed by network node 16 may be performed by one or more elements of network node 16 such as by modification unit 30 in processing circuitry 38, processor 40, radio interface 36, etc. In one or more embodiments, network node 16 is configured to determine (Block S102) an indication of a rate of change of radio resource control, RRC, connected wireless devices, as described herein. In one or more embodiments, network node 16 is further configured to determine (Block S104) whether to modify a physical uplink control channel, PUCCH, physical resource block, PRB, allocation based at least on the rate of change of RRC connected wireless devices 22, as described herein.

According to one or more embodiments, the indication of the rate of change of RRC connected wireless devices is based at least in part on a net rate of PUCCH resource allocation. According to one or more embodiments, the net rate of PUCCH resource allocation is filtered to reduce fluctuations in the net rate of PUCCH resource allocation. According to one or more embodiments, the modification of the PUCCH PRB allocation corresponding to an additional PRB allocation.

According to one or more embodiments, the rate of change of RRC connected wireless devices is configured to cause available PUCCH resources to decrease below a first threshold for triggering of the additional PRB allocation. According to one or more embodiments, the first threshold is calculated based at least on: a net rate PUCCH resource allocation multiplied by a N target number of slots to sustain the net rate PUCCH resource allocation over a next N transmission time intervals, TTIs, where the indication of the rate of change of RRC connected wireless devices 22 is based at least in part on the net rate of PUCCH resource allocation; and a first predefined margin. According to one or more embodiments, the modification of the PUCCH PRB allocation corresponding to a PRB deallocation.

According to one or more embodiments, the rate of change of RRC connected wireless devices is configured to cause available PUCCH resources to increase above a second threshold for triggering of PRB deallocation. According to one or more embodiments, the second threshold is calculated based at least on: a net rate PUCCH resource allocation multiplied by a N target number of slots to sustain the net rate PUCCH resource allocation over a next N transmission time intervals, TTIs, where the indication of the rate of change of RRC connected wireless devices 22 is based at least in part on the net rate of PUCCH resource allocation; and a second predefined margin. According to one or more embodiments, the determination not to modify the PUCCH PRB allocation is based at least in part on the rate of change of the RRC connected wireless devices 22 failing to meet a predefined criterion.

According to one or more embodiments, the predefined criterion includes: a first threshold that is configured to trigger PRB allocation based at least in part on available PUCCH resources being less than the first threshold, and a second threshold that is configured to trigger PRB deallocation based at least in part on the available PUCCH resources being greater than the second threshold. The determination not to modify the PUCCH PRB allocation is based at least on the available PUCCH resources being greater than the first threshold and less than the second threshold. According to one or more embodiments, the first and second thresholds are calculated based at least on: a net rate PUCCH resource allocation multiplied by a N target number of slots to sustain the net rate PUCCH resource allocation over a next N transmission time intervals, TTIs, where the indication of the rate of change of RRC connected wireless devices 22 is based at least in part on the net rate of PUCCH resource allocation; and a respective predefined margin. The predefined margin for the first threshold is less than the predefined margin for the second threshold. According to one or more embodiments, the processing circuitry 38 is further configured to perform communication with a wireless device 22 using at least one PUCCH PRB associated with the determination whether to modify the PUCCH PRB allocation.

Having generally described arrangements for signalling control information for dynamic Physical Uplink Control Channel (PUCCH) resource modification based on a rate of PUCCH resource allocation, details for these arrangements, functions and processes are provided as follows, and which may be implemented by the network node 16 and/or wireless device 22. One or more network node 16 functions described below may be performed by one or more of processing circuitry 38, processor 40, radio interface 36, communication interface 34, modification unit 30, etc. One or more wireless devices 22 functions described below may be performed by one or more of processing circuitry 50, processor 52, radio interface 48, etc.

Figure 5:
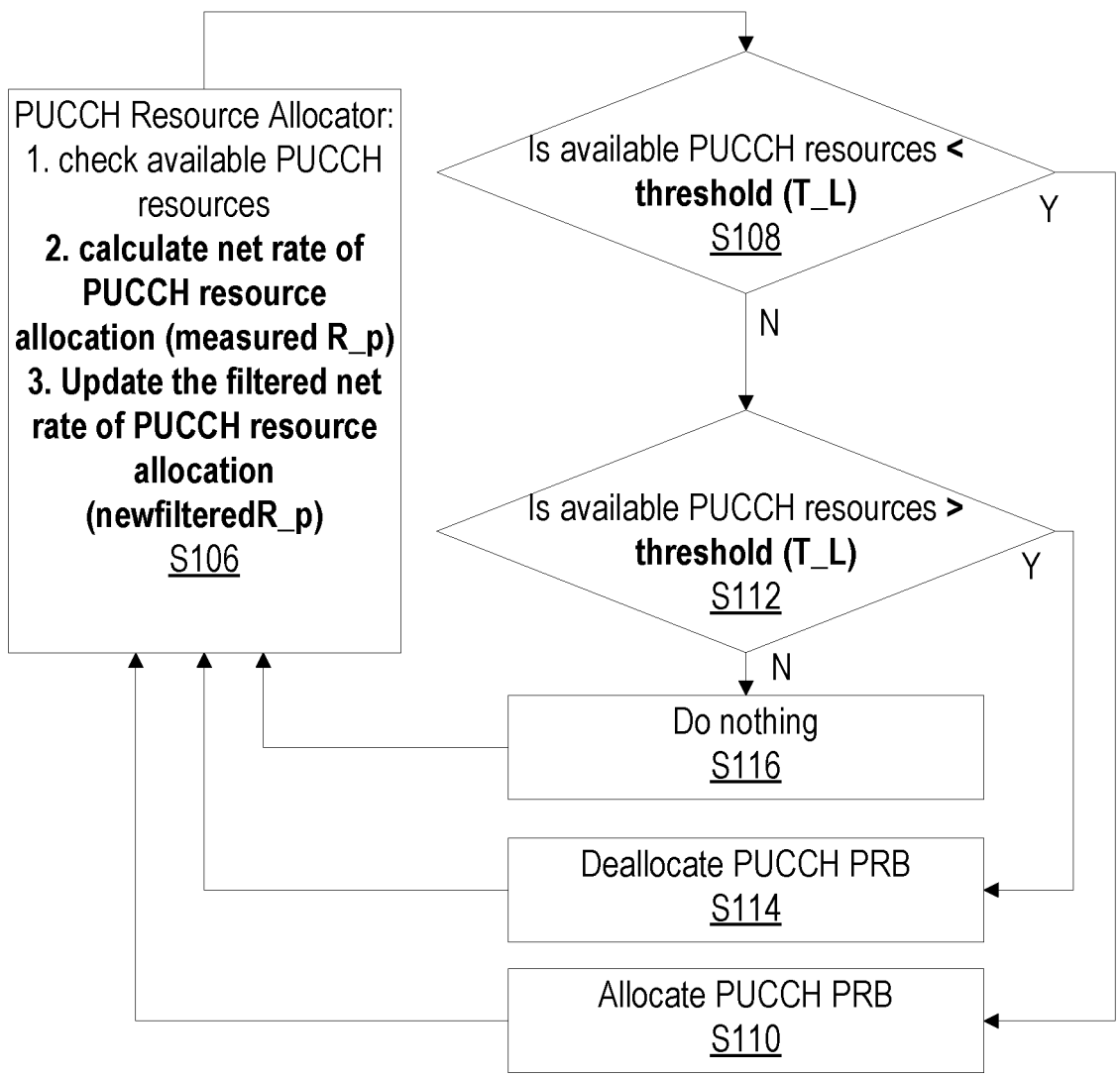
FIG. 5 is a flowchart of another example process in a network node according to some embodiments of the present disclosure.

Embodiments provide dynamic Physical Uplink Control Channel (PUCCH) resource modification based on a rate of PUCCH resource allocation. The rate of PUCCH resource allocation may corresponds to the rate of traffic change and/or rate of adding/removing wireless devices. However, it is noted that the resource allocation concepts and procedures described herein are not limited solely to PUCCH resource allocation/modification. It is contemplated that the concepts and procedures described herein can be applied to other types of resource allocation/modification, for example as may be needed in other aspects of communication resource allocation. FIG. 5 is a flow diagram of a dynamic PUCCH allocation algorithm in accordance with the present disclosure. This allocation algorithm has been modified compared to an existing PUCCH algorithm. In one or more embodiments, the dynamic PUCCH algorithm is performed by network node 16 such as via one or more of processing circuitry 38, processor 40, radio interface 36, modification unit 30, etc. The text in bold represent changes to the existing Dynamic PUCCH algorithm (i.e., changes to the legacy algorithm). The network node 16 is configured to, in Block S106, (1) check available PUCCH resources, (2) calculate net rate of PUCCH resource allocation (measured R_p), and (3) update the filtered net rate of PUCCH resource allocation (newfilteredR_p), as described below.

In FIG. 5, the number of available PUCCH resources are checked by the network node 16, where, if the number is less than a predetermined threshold (T_L) (Block S108), then an action is taken by network node 16 to allocate one more PUCCH PRB (Block S110). In one or more embodiments, more than one PUCCH PRB may be allocated at a time. If the number of available PUCCH resources is greater than a predetermined threshold (T_L)(Block S112), an action is taken by network node 16 to deallocate one PUCCH PRB (Block, S114). In one or more embodiments, more than one PUCCH PRB may be deallocated at a time. If the available PUCCH resources equals the threshold (T_L), the network node 16 may do nothing (S116) as in, for example, the network node 16 may not deallocate and allocate a PUCCH PRB during this process loop instance.

As illustrated in FIG. 5, an additional parameter is considered when determining the threshold of available PUCCH resources. For example, the PUCCH Resource allocator, e.g., modification unit 30, provides/uses a net rate of PUCCH resource allocation as an additional input. As is shown in FIG. 5, the allocation method provided herein considers more than the legacy algorithm, which only considers whether resources are available.

As used herein:

measuredR_p=Net rate of PUCCH Resource Allocation=measured number of PUCCH resources allocation attempts per slot-measured number of PUCCH resource deallocations per slot.

The net rate (measuredR_p) may be filtered by a filtering function as below:

newFilteredR_p=(1−forgettingFactor)*oldFilteredR_p+forgettingFactor*measuredR_p where the forgettingFactor can be adjusted to tune how fast or slow the system needs to react to the change in traffic arrival rate. The filtering may help reduce fluctuations in the data.

A_p=Number of available/unused PUCCH resources in current slot. This may be calculated by network node 16 and may consider all PUCCH PRBs allocated or in the process of being allocated.

N1=Target number of slots of the available/unused PUCCH resources that may be sufficient to a sustain filtered net rate of PUCCH resource allocation without additional increase in PUCCH PRB=depends on time needed for allocating one more PRB.

If A_p<newfilteredR_p*N1+allocationMargin, then the available resources is not sufficient to sustain the current PUCCH allocation rate over next N1 TTIs. newfilteredR_p*N1 is sufficient to sustain the PUCCH allocation rate over next N1 TTIs. However, allocationMargin adds a safety headroom. Then an action may be performed (Block S104) by network node 16 to allocate the PRB. The threshold for a rate of available PUCCH resources for allocating one more PRB is T_L=newfilteredR_p*N1+allocationMargin If A_p>newfilteredR_p*N1+deallocationMargin, this implies that the available PUCCH resources are more than enough to sustain the peak rate of PUCCH resource allocation for greater than the time needed to allocate one more PRB, such that an action can be performed (Block S108) by network node 16 to deallocate the PRB. This way, the system may have enough time to react to an increasing number of wireless devices 22 even after deallocating the PRB. The threshold of available PUCCH resources for deallocating one PRB is T_U=newfilteredR_p*N1+deallocationMargin. deallocationMargin>>allocationMargin to ensure a PUCCH PRB is not deallocated too early.

Therefore, as described herein, the net rate of PUCCH resource allocation is used as additional input in a Dynamic PUCCH algorithm. With this additional input, the system and/or the network node 16 is advantageously able to react faster to an increase in a traffic arrival rate and volume when compared to a legacy dynamic PUCCH algorithm, thereby allowing for reduced congestion that is observed in a legacy system that implemented the modified dynamic PUCCH algorithm described herein.

EXAMPLES

Example A1. A network node 16 configured to communicate with a wireless device 22(WD 22), the network node 16 configured to, and/or comprising a radio interface 36 and/or comprising processing circuitry 38 configured to:
determine to one of allocate and deallocate a physical uplink control channel (PUCCH) physical resource block (PRB) based at least on a rate of PUCCH resource allocation.

Example A2. The network node 16 of Example A1, wherein the rate of PUCCH resource allocation is based on a measured quantity of PUCCH resources allocation attempts per slot minus a measured number of PUCCH resource deallocations per slot.

Example A3. The network node 16 of any one of Examples A1-A2, wherein the rate of PUCCH resource allocation is used as a threshold;
the determination being made to allocate the PUCCH PRB based on a quantity of available PUCCH resources being less than the threshold; and
the determination being made to deallocate the PUCCH PRB based on the quantity of available PUCCH resources being greater than the threshold.

Example B1. A method implemented in a network node 16, the method comprising determining to one of allocate and deallocate a physical uplink control channel (PUCCH) physical resource block (PRB) based at least on a rate of PUCCH resource allocation.

Example B2. The method of Example B1, wherein the rate of PUCCH resource allocation is based on a measured quantity of PUCCH resources allocation attempts per slot minus a measured number of PUCCH resource deallocations per slot.

Example B3. The method of Example any one of B1-B2, wherein the rate of PUCCH resource allocation is used as a threshold;
the determination being made to allocate the PUCCH PRB based on a quantity of available PUCCH resources being less than the threshold; and
the determination being made to deallocate the PUCCH PRB based on the quantity of available PUCCH resources being greater than the threshold.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
|---|---|
| NR | New Radio |
| PUCCH | Physical Uplink Control channel |
| PRB | Physical Resource Block |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A network node, comprising:
   processing circuitry configured to:
   determine an indication of a rate of change of radio resource control, RRC, connected wireless devices; and
   determine whether to modify a physical uplink control channel, PUCCH, physical resource block, PRB, allocation based at least on the rate of change of RRC connected wireless devices, the modification of the PUCCH PRB allocation corresponding to an additional PRB allocation, the rate of change of RRC connected wireless devices being configured to cause available PUCCH resources to decrease below a first threshold for triggering of the additional PRB allocation.

2. The network node of claim 1, wherein the indication of the rate of change of RRC connected wireless devices is based at least in part on a net rate of PUCCH resource allocation.

3. The network node of claim 2, wherein the net rate of PUCCH resource allocation is filtered to reduce fluctuations in the net rate of PUCCH resource allocation.

4. The network node of claim 1, wherein the first threshold is calculated based at least on:
   a net rate PUCCH resource allocation multiplied by a N target number of slots to sustain the net rate PUCCH resource allocation over a next N transmission time intervals, TTIs, the indication of the rate of change of RRC connected wireless devices being based at least in part on the net rate of PUCCH resource allocation; and
   a first predefined margin.

5. The network node of claim 1, wherein the modification of the PUCCH PRB allocation corresponding to a PRB deallocation.

6. The network node of claim 5, wherein the rate of change of RRC connected wireless devices is configured to cause available PUCCH resources to increase above a second threshold for triggering of PRB deallocation.

7. The network node of claim 6, wherein the second threshold is calculated based at least on:
   a net rate PUCCH resource allocation multiplied by a N target number of slots to sustain the net rate PUCCH resource allocation over a next N transmission time intervals, TTIs, the indication of the rate of change of RRC connected wireless devices being based at least in part on the net rate of PUCCH resource allocation; and
   a second predefined margin.

8. The network node of claim 1, wherein the determination not to modify the PUCCH PRB allocation is based at least in part on the rate of change of the RRC connected wireless devices failing to meet a predefined criterion.

9. The network node of claim 8, wherein the predefined criterion includes:
   a first threshold that is configured to trigger PRB allocation based at least in part on available PUCCH resources being less than the first threshold;
   a second threshold that is configured to trigger PRB deallocation based at least in part on the available PUCCH resources being greater than the second threshold; and
   the determination not to modify the PUCCH PRB allocation being based at least on the available PUCCH resources being greater than the first threshold and less than the second threshold.

10. The network node of claim 9, wherein the first and second thresholds are calculated based at least on:
    a net rate PUCCH resource allocation multiplied by a N target number of slots to sustain the net rate PUCCH resource allocation over a next N transmission time intervals, TTIs, the indication of the rate of change of RRC connected wireless devices being based at least in part on the net rate of PUCCH resource allocation;
    a respective predefined margin; and
    the predefined margin for the first threshold is less than the predefined margin for the second threshold.

11. The network node of claim 1, wherein the processing circuitry is further configured to perform communication with a wireless device using at least one PUCCH PRB associated with the determination whether to modify the PUCCH PRB allocation.

12. A method implemented by a network node, comprising:
    determining an indication of a rate of change of radio resource control, RRC, connected wireless devices; and
    determining whether to modify a physical uplink control channel, PUCCH, physical resource block, PRB, allocation based at least on the rate of change of RRC connected wireless devices, the modification of the PUCCH PRB allocation corresponding to an additional PRB allocation, the rate of change of RRC connected wireless devices being configured to cause available PUCCH resources to decrease below a first threshold for triggering of the additional PRB allocation.

13. The method of claim 12, wherein the indication of the rate of change of RRC connected wireless devices is based at least in part on a net rate of PUCCH resource allocation.

14. The method of claim 13, wherein the net rate of PUCCH resource allocation is filtered to reduce fluctuations in the net rate of PUCCH resource allocation.

15. The method of claim 12, wherein the first threshold is calculated based at least on:
    a net rate PUCCH resource allocation multiplied by a N target number of slots to sustain the net rate PUCCH resource allocation over a next N transmission time intervals, TTIs, the indication of the rate of change of RRC connected wireless devices being based at least in part on the net rate of PUCCH resource allocation; and
    a first predefined margin.

16. The method of claim 12, wherein the modification of the PUCCH PRB allocation corresponding to a PRB deallocation.

17. The method of claim 16, wherein the rate of change of RRC connected wireless devices is configured to cause available PUCCH resources to increase above a second threshold for triggering of PRB deallocation.

18. The method of claim 17, wherein the second threshold is calculated based at least on:

a net rate PUCCH resource allocation multiplied by a N target number of slots to sustain the net rate PUCCH resource allocation over a next N transmission time intervals, TTIs, the indication of the rate of change of RRC connected wireless devices being based at least in part on the net rate of PUCCH resource allocation; and a second predefined margin.

19. The method of claim 12, wherein the determination not to modify the PUCCH PRB allocation is based at least in part on the rate of change of the RRC connected wireless devices failing to meet a predefined criterion.

20. The method of claim 19, wherein the predefined criterion includes:
- a first threshold that is configured to trigger PRB allocation based at least in part on available PUCCH resources being less than the first threshold;
- a second threshold that is configured to trigger PRB deallocation based at least in part on the available PUCCH resources being greater than the second threshold; and
- the determination not to modify the PUCCH PRB allocation being based at least on the available PUCCH resources being greater than the first threshold and less than the second threshold.

21. The method of claim 20, wherein the first and second thresholds are calculated based at least on:
- a net rate PUCCH resource allocation multiplied by a N target number of slots to sustain the net rate PUCCH resource allocation over a next N transmission time intervals, TTIs, the indication of the rate of change of RRC connected wireless devices being based at least in part on the net rate of PUCCH resource allocation;
- a respective predefined margin; and
- the predefined margin for the first threshold is less than the predefined margin for the second threshold.

22. The method of claim 12, further comprising performing communication with a wireless device using at least one PUCCH PRB associated with the determination whether to modify the PUCCH PRB allocation.

23. A non-transitory computer readable medium storing instructions, which when executed by a processor, cause the processor to:
- determine an indication of a rate of change of radio resource control, RRC, connected wireless devices; and
- determine whether to modify a physical uplink control channel, PUCCH, physical resource block, PRB, allocation based at least on the rate of change of RRC connected wireless devices, the modification of the PUCCH PRB allocation corresponding to an additional PRB allocation, the rate of change of RRC connected wireless devices being configured to cause available PUCCH resources to decrease below a first threshold for triggering of the additional PRB allocation.

* * * * *